May 5, 1959
H. H. F. AHRENS
2,885,017
VEHICLE
Filed Dec. 6, 1955
2 Sheets-Sheet 1
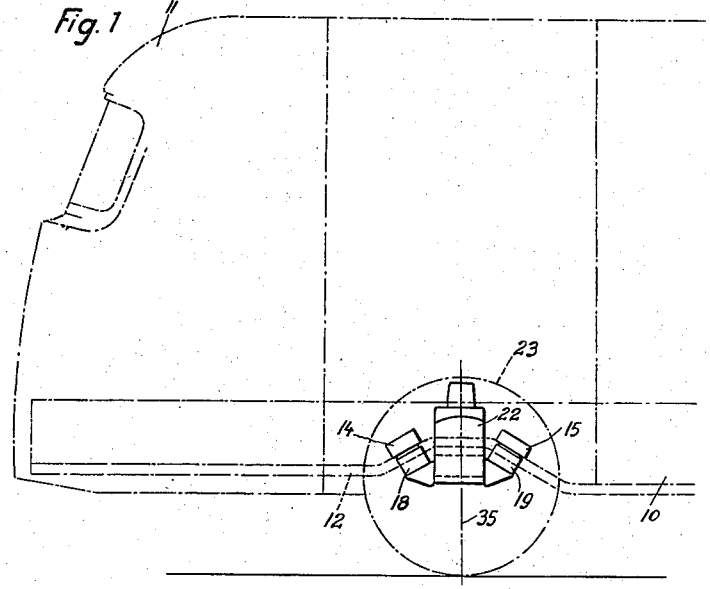
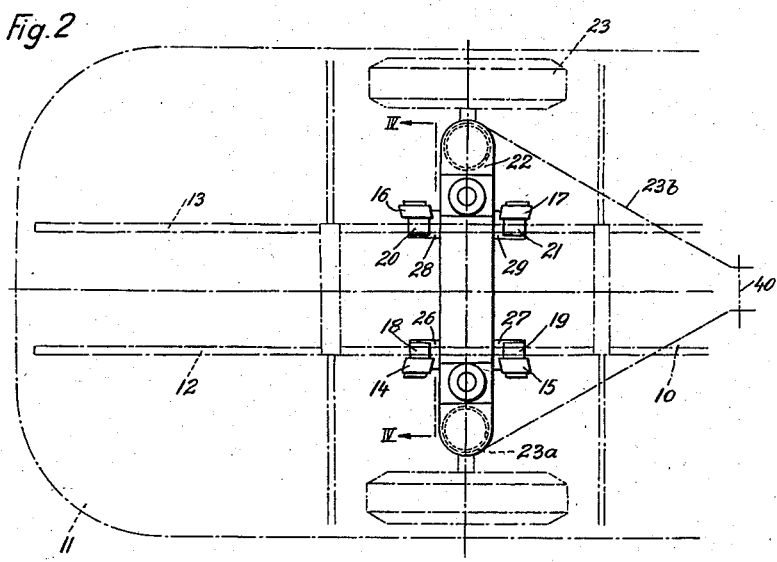
Inventor
HERMANN H.F. AHRENS
BY Dicke and Craig.
ATTORNEYS.

May 5, 1959   H. H. F. AHRENS   2,885,017
VEHICLE
Filed Dec. 6, 1955   2 Sheets-Sheet 2
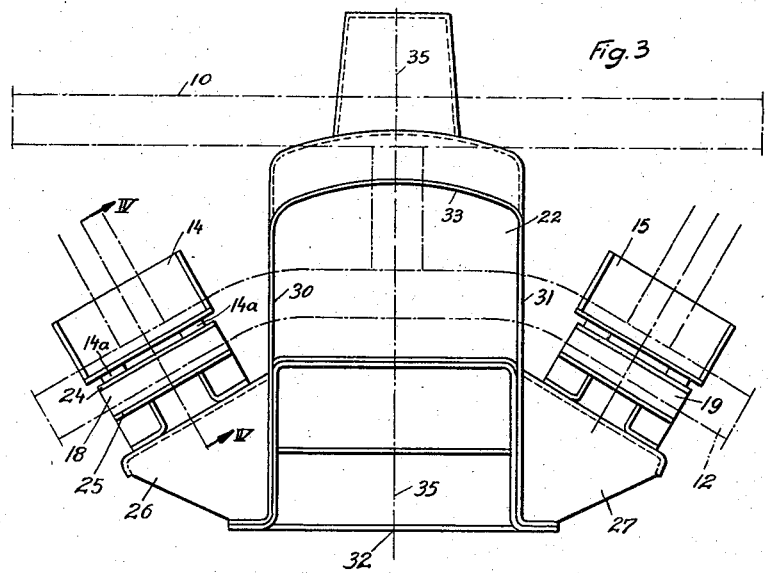
Fig. 3
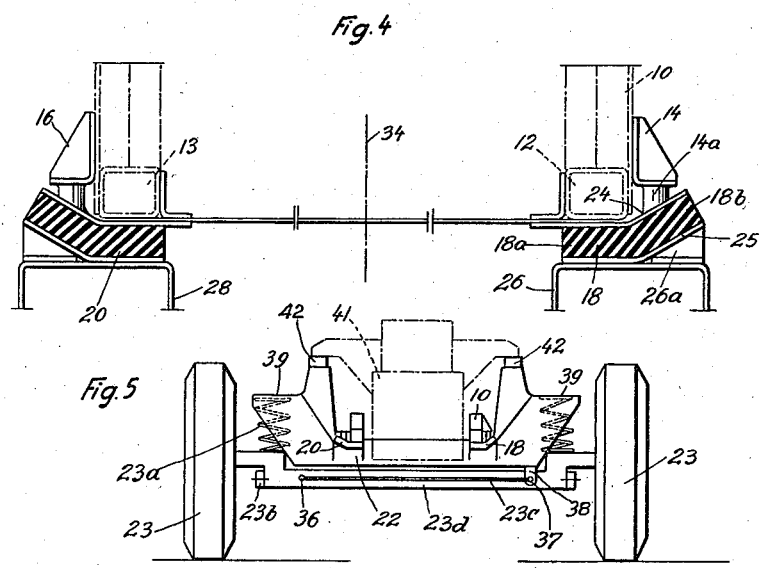
Fig. 4
Fig. 5
Inventor
HERMANN H. F. AHRENS
BY Dicke and Craig.
ATTORNEYS.

United States Patent Office 2,885,017
Patented May 5, 1959

2,885,017

VEHICLE

Hermann H. F. Ahrens, Sindelfingen, Germany, assignor to Daimler-Benz Aktiengesellschaft, Stuttgart-Unterturkheim, Germany Application December 6, 1955, Serial No. 551,391

7 Claims. (Cl. 180—64)

The present invention relates to a vehicle and, more particularly, to improved means for cushioning a wheel-supported transverse beam with respect to the vehicle superstructure.

It is the object of the invention to so cushion the vehicle body as to absorb impacts and vibrations arising owing to the travel of the wheels on the road, and to provide improved means for so mounting the vehicle superstructure on a wheel-supported transverse beam or transverse auxiliary member by resilient mounting means that all forces acting on the beam in horizontal directions and braking and driving couples acting on the beam will be taken up by the resilient mounting means in a reliable manner.

Further objects of the invention will appear from a detailed description of a preferred embodiment thereof following hereinafter and the features of novelty will be pointed out in the claims, it being understood that such detailed description serves the purpose of illustrating the invention rather than that of restricting or limiting the same. In the drawings, Fig. 1 is a diagrammatical side view of the transverse wheel-supported beam and of the resilient mounting means, the wheels and the vehicle superstructure being diagrammatically indicated by dash-dotted lines, Fig. 2 is a plan view of the matter shown in Fig. 1, Fig. 3 is a view similar to that of Fig. 1 on an enlarged scale, Fig. 4 is a section taken along the line IV—IV of Fig. 3, and Fig. 5 is a diagrammatical front view of the transverse beam, of the wheels, and of means for guiding the same for relative up-and-down movement.

The superstructure of the vehicle, such as a bus shown in Fig. 1, may comprise a frame 10 and a suitable body 11. The body 11 may comprise a unit detachably connected to the frame 10 or, alternatively, may constitute an integral structure therewith to constitute a self-supporting body. The frame 10 includes a pair of spaced parallel longitudinal beams 12 and 13 which, in the embodiment shown, are formed by box-shaped sheet metal elements and in the region of the front wheels are offset upwardly, as will appear from Figs. 1 and 3. The vehicle superstructural elements 12 and 13 are resiliently supported by a transverse beam 22 which, in the embodiment shown, is formed by a hollow sheet metal element having side walls 30 and 31, a bottom wall 32, and a top wall 33. This transverse beam 22 is supported by a pair of front wheels 23, suitable guiding means being provided which connect the wheels 23 to the beam 22 and guide the wheels and the beam for relative up-and-down movement. Such guiding means will be described later.

The present invention relates to resilient means inserted between the body elements 12, 13 and the transverse beam 22 and adapted to restrict relative universal movement between said body elements and said beam.

In the embodiment shown, such resilient means are comprised of four rubber cushions 18, 19, 20 and 21 which are spaced from the central vertical plane 34 of the body and from the central vertical plane 35 of the beam 22. Each of cushions 18, 19, 20 and 21 have at least one flat portion. As will appear from Figs. 3 and 4, each cushion 18, 19, 20, or 21 respectively is inclined to both of the planes 34 and 35, and the cushions are disposed symmetrically with respect to each of the planes 34 and 35.

Each cushion comprises a pair of substantially equidistant metal plates, such as 24 and 25 in Figure 3, and a rubber body 18 which substantially fills the place between the metal plates 24 and 25 and is bonded to the same. The upper sheet metal plates 24 are rigidly attached to the vehicle superstructure, whereas the lower sheet metal plates are rigidly attached to the transverse beam 22. For the purpose of such attachment, brackets 14, 15, 16 and 17 are fixed to the vertical side walls of the longitudinal beams 12 and 13 on opposite sides of and equally spaced from the plane 35 and in symmetrical relationship to such plane. It will be noted that each bracket is so inclined that its bottom face extends at an acute angle to the plane 35 and parallel to the associated inclined section of the longitudinal beam 12, or 13 respectively. Each of the upper sheet metal plates 24 has an inner section extending beneath the associated longitudinal beam 12, or 13 respectively, and in contact therewith, and an upwardly inclined outer section extending beneath the associated brackets 14, 15, 16, or 17 respectively.

Spacer blocks 14a are inserted between the outer section of plate 24 and the bracket disposed thereabove. The lower sheet metal plate 25 is secured to a bracket 26, 27, 28, or 29 respectively, which is mounted on the side wall 30, or 31 respectively, of the transverse beam 22, as will appear from Fig. 3.

The guide means for guiding and supporting the front wheels 23 and the beam 22 for relative up-and-down movement are comprised of a rigid axle 23d on which the wheels 23 are journalled, and a transverse link 23c having one end pivotally connected at 36 to the axle 23d and having its other end pivotally connected at 37 to a bracket 38 depending from the transverse beam 22 and rigidly connected therewith. Helical springs 23a are inserted between the ends of the axle 23d and suitable spring-supporting brackets 39 formed integral with the transverse beam 22. Moreover, a pair of thrust links 23b schematically shown in Figure 2 is provided which have their rear ends mounted on the body 10 for pivotal movement about a horizontal transverse axis 40 spaced from the transverse beam 22 rearwardly thereof, and have their front ends suitably secured to the axle 23d preferably by resilient means including rubber cushions. In this manner, the axle 23d and the wheels 23 journalled thereon may move up and down and may rock about a longitudinal axis relative to the transverse beam 22.

From the foregoing description it will appear that the resilient means inserted between the frame 10 and the beams 22 comprise two pairs of flat portioned rubber cushions, such as the pair 18, 19 and the pair 20, 21. These pairs are disposed on both sides of and laterally spaced from the central longitudinal vertical plane 34 of the frame 10 in opposite relationship. Each pair comprises a cushion, such as 18, disposed in front of the beam 22 and a cushion, such as 19, disposed in opposite relationship thereto at the rear of said beam 22. The cushions constituting the pair 18, 19 or 20, 21 are symmetrically inclined to the vertical central plane 35 of the beam 22 so as to constitute a V when viewed in horizontal direction transversely to the vehicle, as shown in Figs. 1 and 3. Moreover, the pairs 18, 19 and 20, 21 are symmetrically inclined to the vertical central longitudinal plane 34 of the body so as to constitute a V when viewed in horizontal direction lengthwise of the vehicle, as shown in Fig. 4. In the embodiment shown, the first mentioned V is inverted and opens downwardly, while the secondly mentioned V opens upwardly. In other words, the symmetrical inclination of the cushions with respect to the vertical central plane 35 of the beam 22 is opposite to the symmetrical inclination of the pairs of cushions 18, 19 and 20, 21 with respect to the vertical central longitudinal plane 34 of the body.

Moreover, it will appear that the rubber cushions 18, 19, 20 and 21 are so profiled in a cross section of the vehicle as to form an angle, each cushion having one section, such as 18a, underlying the longitudinal beam 12, or 13 respectively, of the superstructure and mounted in direct contact with the brackets 26, 27, 28, or 29 respectively, and having its other section 18b extending outwardly so disposed as to be inclined upwardly, tapered spacers 26a being preferably interposed between the inclined outer section of sheet metal lining 25 of the cushion and the underlying bracket, such as 26, see Fig. 4. The spacer elements 14a and 26a may be welded to one of the adjoining elements and detachably connected, for instance by screws, to the other one of the adjoining elements. Thus, the spacer element 26a may be welded to bracket 26 and detachably connected to sheet metal lining 25 of the rubber cushion or, alternatively, may be welded to the sheet metal lining 25 and may be detachably connected to the bracket 26.

Recapitulating what has been described hereinabove, the arrangement is so provided that the rubber cushions 18, 19 or 20, 21 are pairwise disposed on both sides of the transverse beam 22 and also on both sides of the vertical longitudinal central plane 34 of the vehicle in such a manner that viewed in the longitudinal section of the vehicle they are positioned in V shape, the V being inverted, and viewed in the transverse section of the vehicle they are positioned to constitute a V opening upwardly. Since the rubber cushions permit of relative substantially parallel displacement of their metal linings 24 and 25, the body and the beam may perform a relative universal movement. In such universal movement which is restricted by the resiliency of the rubber cushions, the latter determine a transverse axis of relative pivotal displacement between the superstructure 10 and the transverse member 22, such axis being located at a low level preferably substantially coinciding with the road surface. Moreover, the rubber cushions determine a longitudinal axis of relative pivotal displacement between the superstructure 10 and the transverse member 22, such latter axis being located at a high level preferably coinciding with the center of gravity of the superstructure 10. In this manner, the body is reliably supported on the transverse member against longitudinal forces as well as transverse forces. Thus, a great stability of the body will be ensured in spite of the effective absorption of the impacts and vibrations resulting from the travel of the wheels on the road. Also, all couples acting on the transverse beam about the longitudinal or the transverse axis, such as may arise from braking and driving couples, will be taken up in a reliable manner.

If desired, a driving unit, such as an engine 41 (Fig. 5), may be supported by the transverse beam and resilient cushioning means, such as 42, may be inserted between the driving unit and the transverse beam 22. The driving unit may be entirely supported by the transverse beam or may be supported by both the transverse beam and the vehicle body. Preferably, the supporting means supporting the driving unit on the transverse beam are disposed in a transverse plane extending through the center of gravity of the driving unit. With this arrangement the means supporting the driving unit on the transverse beam 22 and on the superstructure of the vehicle need take up but low forces and, therefore, may be formed by very soft rubber cushions.

It is an important feature of the present invention that the resilient cushions 18, 19, 20 and 21 connecting the vehicle superstructure with the transverse beam 22 are disposed in inclined positions and are, therefore, capable of transferring not only vertical forces but also horizontal forces, both kinds of forces setting up compressional stresses in the rubber cushions. Preferably, the resilient cushions disposed on opposite sides of the vertical central plane 34 of the vehicle are so oppositely inclined as to determine a horizontal axis of relative pivotal displacement of the vehicle superstructure and the transverse beam, such axis being substantially located in the plane 34, preferably at the level of the center of gravity of the vehicle superstructure. This means that the vehicle superstructure can rock about a generally horizontal axis relative to the transverse beam to a limited extent and the cushions will absorb this rocking motion. Moreover, the cushions provide a buffer between the beam and the superstructure whereby all of the irregularities of the road surface are not transferred to the latter.

While the invention has been described in connection with a preferred embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What I claim is:

1. In a vehicle, the combination comprising a vehicle superstructure, a transverse beam connected to said superstructure, a pair of wheels, guide means connecting said wheels to said beam to guide said wheels for relative up-and-down movement with respect to said beam, and resilient means inserted between said superstructure and said beam, said resilient means comprising two pairs of rubber cushions, said pairs being disposed on both sides of and laterally spaced from the central longitudinal vertical plane of said superstructure, each pair comprising a cushion disposed in front of said beam and a cushion disposed at the rear of said beam, the cushions constituting said pair being symmetrically inclined to the vertical central plane of said beam, and said pairs of rubber cushions being symmetrically inclined to the vertical central longitudinal plane of said superstructure.

2. The combination as claimed in claim 1 further comprising a driving unit supported by said transverse beam and resilient cushion means inserted between said driving unit and said transverse beam.

3. The combination as claimed in claim 1 in which the symmetrical inclination of each said pair of cushions with respect to said vertical central plane of said beam forms a V which opens in a direction opposite to the opening direction of a V formed by the symmetrical inclination of said pairs of rubber cushions with respect to said vertical central longitudinal plane of said body so that one of said V's is inverted.

4. The combination as claimed in claim 3 in which said first mentioned V is inverted while said secondly mentioned V opens upwardly.

5. The combination as claimed in claim 1 in which each of said rubber cushions comprises a pair of substantially equidistant metal plates and a rubber body substantially filling the space therebetween and being bonded to said metal plates, each of said plates having a horizontal section and an inclined section.

6. In a vehicle, the combination comprising a vehicle superstructure, a transverse beam carrying said superstructure, a pair of wheels, guide means connecting said wheels to said beam to guide said wheels for relative up-and-down movement with respect to said beam, and resilient means inserted between said superstructure and said beam, said resilient means comprising four rubber cushions spaced from the central vertical planes of said superstructure and of said beam and inclined to both of said planes and symmetrically disposed to each of said planes, said cushions being adapted to restrict relative universal movement between said superstructure and said beam.

7. The combination as claimed in claim 6 in which each of said rubber cushions comprises a pair of substantially equidistant metal plates and a rubber body substantially filling the space therebetween and being bonded to said metal plates.

References Cited in the file of this patent
UNITED STATES PATENTS

| | | |
|---|---|---|
| 2,182,248 | Chayne | Dec. 5, 1939 |
| 2,208,709 | Tjaarda | July 23, 1940 |
| 2,311,420 | Ulrich | Feb. 16, 1943 |